(12) United States Patent
Henn et al.

(10) Patent No.: US 7,174,880 B2
(45) Date of Patent: Feb. 13, 2007

(54) METHOD FOR OPERATION OF AN INTERNAL COMBUSTION ENGINE

(75) Inventors: Michael Henn, Lehre (DE); Martin Jehle, Regensburg (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/502,954

(22) PCT Filed: Jan. 5, 2004

(86) PCT No.: PCT/EP2004/000031

§ 371 (c)(1),
(2), (4) Date: Oct. 31, 2005

(87) PCT Pub. No.: WO2004/067938

PCT Pub. Date: Aug. 12, 2004

(65) Prior Publication Data

US 2006/0054134 A1    Mar. 16, 2006

(30) Foreign Application Priority Data

Jan. 30, 2003    (DE) ................................ 103 03 699

(51) Int. Cl.
*F02M 7/00*    (2006.01)
*F02B 33/22*    (2006.01)

(52) U.S. Cl. ............... 123/436; 123/90.15; 123/339.14; 123/350

(58) Field of Classification Search ............... 701/101, 701/103; 123/436, 432, 325, 90.11, 90.15, 123/90.16, 406.23, 406.24, 406.25
See application file for complete search history.

(56) References Cited

U.S. PATENT DOCUMENTS

| | | | |
|---|---|---|---|
| 5,293,553 A | | 3/1994 | Dudek et al. |
| 6,508,229 B2 * | | 1/2003 | Miyakubo et al. ........... 123/305 |
| 6,520,131 B2 * | | 2/2003 | Takahashi et al. ........ 123/90.17 |
| 6,561,147 B2 * | | 5/2003 | Takahashi et al. ........ 123/90.15 |
| 6,997,161 B2 * | | 2/2006 | Fuwa et al. .................. 123/345 |
| 2002/0062801 A1 * | | 5/2002 | Shimizu ................... 123/90.16 |
| 2003/0083799 A1 * | | 5/2003 | Fuwa ......................... 701/102 |
| 2003/0116131 A1 * | | 6/2003 | Majima et al. ......... 123/406.53 |
| 2004/0094107 A1 * | | 5/2004 | Nakano et al. ........... 123/90.16 |

FOREIGN PATENT DOCUMENTS

| | | |
|---|---|---|
| DE | 196 15 542 A1 | 10/1997 |
| DE | 197 09 955 A1 | 9/1998 |
| DE | 199 51 989 A1 | 11/2000 |
| DE | 100 39 785 A1 | 2/2002 |
| WO | WO 97/35106 | 9/1997 |

* cited by examiner

*Primary Examiner*—John T. Kwon
(74) *Attorney, Agent, or Firm*—Morrison & Foerster LLP

(57) ABSTRACT

An internal combustion engine has an air intake tract which comprises at least one inlet pipe leading to one intake duct per cylinder of the internal combustion engine. It also has at least one exhaust gas duct per cylinder of the internal combustion engine, at least a first actuator which is disposed in an inlet pipe or in an intake duct or in an exhaust gas duct and influences the gas exchange in the respective cylinder.

10 Claims, 5 Drawing Sheets

METHOD FOR OPERATION OF AN INTERNAL COMBUSTION ENGINE

CLAIM FOR PRIORITY

This application is a national stage of International Application No. PCT/EP04/00031 which was filed on Jan. 5, 2004, and which claims the benefit of priority to German Application No. 103 03 699.7 filed on Jan. 30, 2003.

TECHNICAL FIELD OF THE INVENTION

The invention relates to a method for controlling an internal combustion engine having an air intake tract.

BACKGROUND OF THE INVENTION

A method for controlling an internal combustion engine is known from WO 97/35106. With the method, different estimated quantities such as the inlet pipe pressure, the mass flow rate in the air intake tract in the area of the throttle valve, the mass flow rate into the cylinders of the internal combustion engine and the exhaust gas back-pressure are determined by means of an observer. An observer can determine estimated values of certain quantities, i.e. estimated quantities, of a system, in this case the internal combustion engine, in each case as a function of recorded measured variables or further estimated values. This is achieved through appropriate modeling of the system of the internal combustion engine. Thus, more quantities can be used to control the internal combustion engine than are recorded by sensors. With regard to low exhaust gas emissions of the internal combustion engine it is necessary to determine all the quantities with great precision—thus also the estimated quantities.

SUMMARY OF THE INVENTION

The invention relates to a method for controlling an internal combustion engine having an air intake tract which comprises at least one inlet pipe leading to an intake duct per cylinder of the internal combustion engine, with at least one exhaust gas duct per cylinder of the internal combustion engine, with at least a first actuator which is disposed in an inlet pipe or in an intake duct or in an exhaust gas duct and then influences gas exchange in the respective cylinder, with further actuators which act upon the internal combustion engine and with sensors which record the readings of measured variables.

In one embodiment of the invention, the position of the first actuator or actuators is varied and that in preset selected positions, measured variables for determining a first and further estimated quantity are recorded, whereby the first and/or further estimated quantity are determined as a function of an estimated value or a reading of the position of the first actuator or actuators and of an adjustment value for the estimated value or reading of the position. An optimization procedure is executed by means of which deviations of the first estimated quantity from the further estimated quantity are minimized for preset selected positions by adapting the adjustment value for the estimated value or the reading of the position. In the further operation of the internal combustion engine at least one correction variable for controlling the first and/or further actuator or actuators is dependent on at least one estimated quantity, which is determined as a function of an estimated value or a reading of the position of the first actuator or actuators and based also on the adjustment value for the estimated value or reading of the position.

This provides a simple way of ensuring that despite inaccuracies in the manufacture of the first actuator or actuators and inaccuracies in the recording of the estimated value or reading of the position of the first actuator or actuators, it is possible to obtain a very precise determination of the further estimated quantity and of any other estimated quantity. The correction of the estimated value or reading of the position of the first actuator or actuators is thus done individually for the circumstances of the respective internal combustion engine. Thus a greater manufacturing tolerance can also be accepted for the first actuators including the assigned servo drives and possibly the sensors recording the position, without any loss of precision in the determination of the estimated quantities.

The above-mentioned advantages are also present if the position of the first actuator or actuators is varied and a first measured variable is recorded in preset selected positions and at least one further measured variable is recorded to determine a further estimated quantity, whereby the further estimated quantity is determined as a function of an estimated value or a reading of the position of the first actuator or actuators and an adjustment value for the estimated value or reading of the position. An optimization procedure is executed by means of which deviations of the first measured variable from the further estimated quantity are minimized for preset selected positions by adapting the adjustment values for the estimated value or reading of the position. In the further operation of the internal combustion engine, estimated quantities that are determined as a function of an estimated value or a reading of the position of the first actuator or actuators, are also determined as a function of the adjustment value for the estimated value or reading of the position.

In an advantageous embodiment of the invention, when the internal combustion engine is in a steady-state operating mode, the position of the first actuator or actuators is varied and the measured variables are determined in the preset positions. This has the advantage that in a steady-state operating mode one can ensure that the adjustment value or values are determined reliably and with precision. By means of a suitable selection of the positions, in which pairs of variates of the estimated quantity or measured variable and of the further estimated quantity are determined, one can ensure a very good convergence of the optimization procedure.

In a further advantageous embodiment the steady-state operating mode is the idle state or fuel cut-off in the overrun state. This has the advantage that the determination of the adjustment value or values has no effect on the performance of the internal combustion engine and so can be carried out almost unnoticed by the driver and no significant emissions are produced in the process.

BRIEF DESCRIPTION OF THE DRAWINGS

Exemplary embodiments of the invention are explained below with reference to the drawings, in which.

Elements of identical construction and function are identified by the same reference characters throughout the figures.

DETAILED DESCRIPTION OF THE INVENTION

Figure 1:
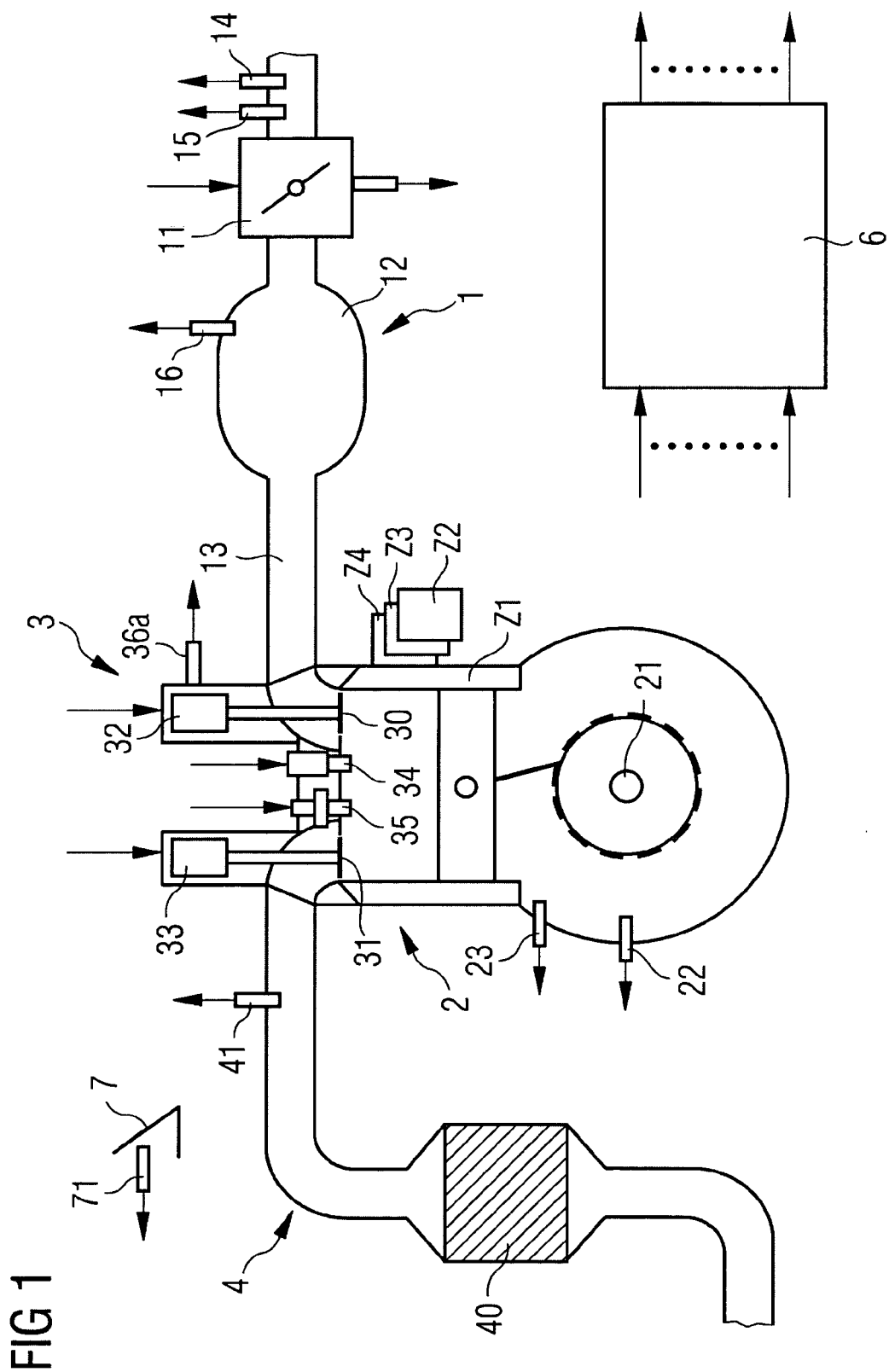
FIG. 1 shows an internal combustion engine.
Figure 2:
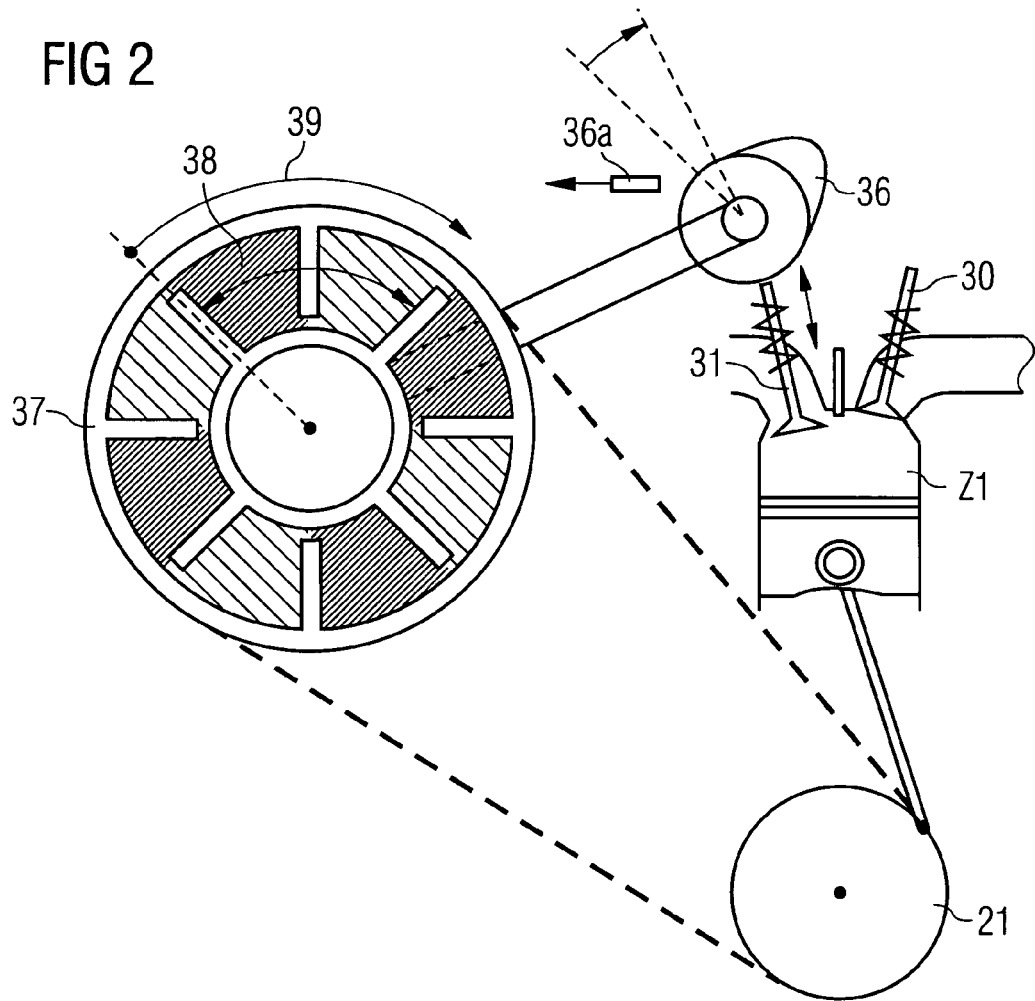
FIG. 2 shows an adjusting drive for the camshaft of the internal combustion engine.

An internal combustion engine (see FIG. 1) comprises an air intake tract 1, an engine block 2, a cylinder head 3 and an exhaust gas tract 4. The air intake tract comprises preferably a throttle valve 11, further a collector 12 and an inlet pipe 13 which is routed to a cylinder Z1 via an intake duct in the engine block 2. The engine block comprises further a crankshaft 21 which is coupled to the piston of the cylinder via a connecting rod.

Figure 3:
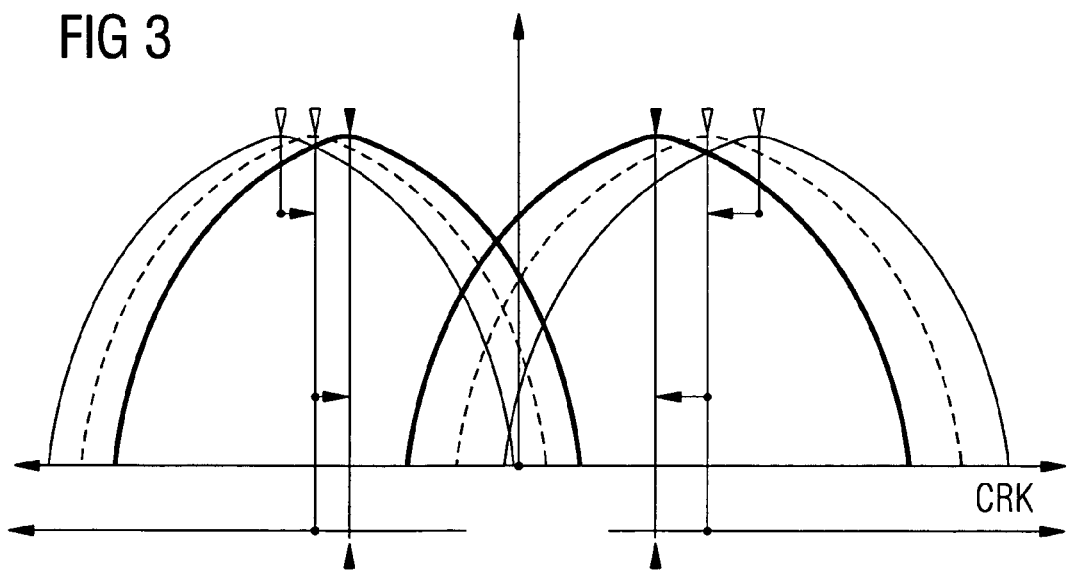
FIG. 3 shows valve lift curves of gas inlet and outlet valves in the internal combustion engine.

The cylinder head comprises a valve actuating mechanism with an inlet valve 30, an outlet valve 31 and valve drives 32, 33. The gas inlet valve 30 and the gas outlet valve 31 are preferably driven by means of a camshaft 36 (see FIG. 3) or possibly by means of two camshafts, whereby one is assigned to each of the gas inlet valve 30 and the gas outlet valve 31 respectively. The drive for the gas inlet valve 30 and/or the gas outlet valve 31 preferably comprises, in addition to the camshaft 36, an adjusting drive 37 which is coupled on the one hand to the camshaft 36 and on the other hand to the crankshaft 21. The phase between crankshaft 21 and the camshaft 36 can be regulated by means of the adjusting drive. In the present exemplary embodiment this is achieved by raising the pressure in the high-pressure chambers 38 of the adjusting drive 37 or by lowering the corresponding pressure depending in which direction the adjustment should occur. The possible adjustment range is marked in FIG. 3 by the arrow 39.

Due to inaccuracies in manufacture and assembly of the adjusting drive or of the camshaft 36 or of the camshaft sensor 36a, inaccuracies can arise in the phase shift between camshaft 36 and crankshaft 21. This is explained with reference to FIG. 3, in which the valve lift curves of the gas inlet valve 30 and of the gas outlet valve 30, 31 are plotted against the crankshaft angle. In this case the lift curves drawn in bold show the present position of the adjusting drive, the dashed valve lift curve shows the position at the mechanical stop if this has no tolerance, and the thin line shows the valve lift curve at the mechanical stop if this has an actual tolerance.

The cylinder head 3 (FIG. 1) further comprises an injection valve 34 and a spark plug 35. Alternatively the injection valve can be disposed in the intake duct 13.

There is a catalytic converter 40 in the exhaust gas tract 4. In addition a control device 6 is provided to which device sensors are assigned which record the different measured variables. The control device 6 determines correction variables as a function of at least one of the measured variables, which correction variables are then converted into position signals for controlling the actuators using corresponding servo drives.

The sensors are a pedal position encoder 71, which records the position of an accelerator pedal 7, an air mass sensor 14, which records an air mass flow upstream of the throttle valve 11, a temperature sensor, which records the air intake temperature T_IM, a pressure sensor 16, which records the inlet pipe pressure P_IM, a crankshaft angle sensor 22, which records a crankshaft angle, to which angle a speed N is then assigned, a further temperature sensor 23, which records a coolant temperature, a camshaft sensor 36, which records the camshaft angle CRK and an oxygen probe 41, which records the residual oxygen content of the exhaust gas in the exhaust gas tract 4 and assigns an air ratio to this content. Depending on the embodiment of the invention, there can be any desired subset of the above-mentioned sensors or also additional sensors.

The actuators are, for example, the throttle valve 11, the gas inlet and gas outlet valves 30,31, the injection valve 34, and the spark plug 35. They are controlled by means of electrical, electromechanical, hydraulic, mechanical, piezo or other servo drives known to a person skilled in the art. In the following, the actuators and actuators are referred to as actuators.

In addition to the cylinder Z1 which is represented in detail, there are typically further cylinders Z2–Z4 present in the internal combustion engine, to which cylinders are assigned corresponding inlet pipes, exhaust gas ducts and actuators.

Observer equations for different sizes of the internal combustion engine can be formed using model-assisted calculation methods based on physical trials. These calculation equations are based on the mass balances of the mass flows in the air intake tract and the gas equations.

Thus, the following relation can be put up, for example, for the air mass flow in the air intake tract in the area of the throttle valve:

$$\dot{m}_{thr} = C_1(T_{im}) \cdot A_{red}(\alpha_{thr}) \cdot p_{thr} \cdot \psi\left(\frac{p_{im}}{p_{thr}}\right) \tag{F1}$$

where $\dot{m}_{thr}$ is the air mass flow in the area of the throttle valve, $C_1(T_{im})$ is a first factor $C_1$ dependent on the temperature in the air intake tract, $A_{red}$ is the reduced flow cross-section at the throttle valve, $\alpha_{thr}$ is the degree of opening of the throttle valve, $p_{thr}$ is the pressure upstream of the throttle valve, which pressure essentially corresponds to the ambient pressure, $p_{im}$ is the pressure in the air intake tract, in other words the inlet pipe pressure.

The following relation can also be set up for the air mass flow in the cylinder of the internal combustion engine:

$$\dot{m}_{cyl} = N_s(N, ES) \cdot p_{im} - \eta_{o1}(N, VO) \tag{F2}$$

or $$\dot{m}_{cyl} = \eta_s(N, ES) \cdot p_{im} - \eta_{o2}(N, AS) \tag{F3}$$

$\dot{m}cyl$ is the air mass flow in the cylinder, $\eta_s(N,ES)$ is a function dependent on the speed and the inlet-closes angle ES of the gas inlet valve 30, $\eta_{o1}(N,VO)$ is a further function dependent on the speed and the duration of valve overlap VO between the gas inlet valve and the gas outlet valve 31 and $\eta_{o2}(N,AS)$ is a further function dependent on the speed and the outlet-closes angle AS. The functions $\eta_s$, $\eta_{o1}$, and $\eta_{o2}$ can be placed in the control device of the internal combustion engine in the form of engine characteristic maps.

Corresponding model equations for the air mass flow in the cylinder, the mass flow area of the throttle valve and also further equations such as for the inlet pipe pressure, the exhaust gas back-pressure, the exhaust gas temperature or a residual gas mass flow and their derivation are disclosed in WO 97/35106, which is herewith included in this regard together with its contents.

Using such model equations, an observer determines quantities not directly accessible to the measurement as estimated quantities.

Exemplary embodiments of programs for controlling the internal combustion engine are described below with reference to the following figures.

Figure 4:
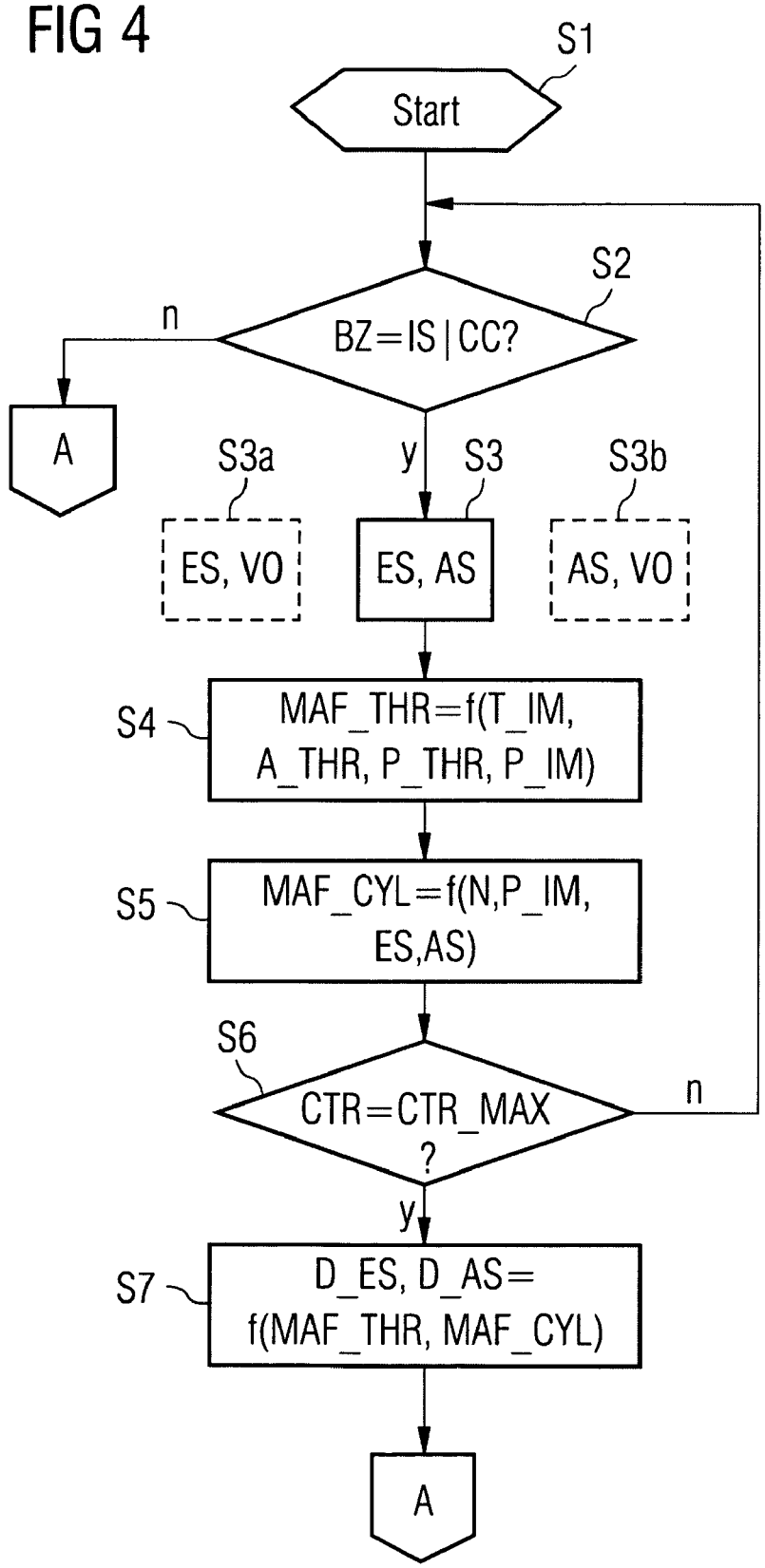
FIGS. 4, 5 shows a first or second part of a flow chart for controlling the internal combustion engine.

The program is started in step S1 (see FIG. 4). In step S2 it is checked whether the internal combustion engine is in an operating state BZ, which is the idle state IS or the fuel cut-off in the overrun state CC. These operating states are distinguished by the fact that they are, for one thing, steady-state operating modes, with the consequence that the air mass flow in the area of the throttle valve 11 is the same as the air mass flow into the cylinders Z1 to Z4 of the internal combustion engine and a change in the position of the actuator or actuators to influence the gas exchange in the respective cylinder does not affect the driving operation and thus is no longer noticeable by the driver and no substantial additional emissions are generated by the adjustment.

If the condition of step S2 is not met, then the processing is continued in the step following the connection point A. If, however, the condition of step S2 is met, then in a step S3, the position of the first actuator or actuators is varied. In step S3, for example, the inlet-closes angle ES of the gas inlet valve 30 is changed by a preset value and in the same way the outlet-closes angle AS of the gas outlet valve 35 is varied by a preset angle. This can be done by multiple iterations of step S3 with, for example, the same increment or with an advantageously selected other variable increment, for example, across the entire adjustment range of the adjusting drive 37. Alternatively it is also possible that preset points of the adjustment range are adjusted.

Subsequently, in a step S4, an observer is used to determine an air mass flow MAF_THR in the air intake tract 1 in the area of the throttle valve 11. This is determined as a function of the air intake temperature T_IM, the degree of opening of the throttle valve A_THR, the ambient pressure P_THR and the inlet pipe pressure P_IM. The ambient pressure P_THR can be easily determined here in an operating state with almost fully opened throttle valve 11 from the inlet pipe pressure P_IM recorded by the inlet pipe pressure sensor 16. The inlet pipe pressure P_IM is a measured variable. The measured variables are assigned to the respective selected position of the first actuator or actuators and held in intermediate storage.

In a step S5, a further observer is used to determine the air mass flow MAF_CYL into the cylinders Z1 to Z4 of the internal combustion engine as a further estimated quantity. This is determined as a function of the speed N, the inlet pipe pressure P_IM, the inlet-closes angle ES and the outlet-closes angle AS of the gas inlet valve 30 or of the gas outlet valve 31. The inlet-closes angle ES and the outlet-closes angle AS are indexed to the mechanical reference position of the adjusting drive 37 without process tolerance. The inlet-closes angle ES or the outlet-closes angle AS is determined as a function of the measured variables, crankshaft angle CRK and camshaft angle and can therefore deviate from an actual inlet-closes angle or outlet-closes angle. The measured variables are assigned to the respective selected position of the first actuator or actuators and buffered in intermediate storage.

In a step S6, it is then checked whether a counter CTR has a maximum value CTR_MAX, which is, for example, the value 50, and with which it is then ensured that measured variables assigned to the preset selected positions of the first actuator or actuators have been determined, the measured variables being for determining the first and second estimated quantity in steps S4 and S5 in successive passes. If the condition of step S6 has not been met, then the processing is continued anew in step S2. If the condition of step S6 has, however, been met, then the processing is continued in step S7.

In a step S7, a first adjustment value D_ES for the inlet-closes angle ES and a second adjustment value D_AS for the outlet-closes angle AS are determined using an optimization procedure. The mean square error is preferably used here as a quality function. This is done using the measured variables determined in the respective passes of steps S4 and S5, the measured variables being for determining the estimated quantities for air mass flow MAF_THR in the air intake tract 1 in the area of the throttle valve 11 and the air mass flow MAF_CYL into the cylinders Z1 to Z4 and the position of the first actuator, which position having been assigned to the respective pass, i.e. in this case the inlet-closes angle ES or of the outlet-closes angle AS.

The adjustment value is varied and as a result there is then assigned to the respective estimated value of the air mass flow MAF_THR, said value being assigned to the respective position of the actuator, an estimated value, altered according to the adjustment value, of the air mass flow MAF_CYL into the cylinders Z1 to Z4 in the respective position of the actuator, the said estimated value then being determined by means of the observer. For a predeterminable number of variations of the adjustment value there is then determined the mean square deviations of the estimated values of the air mass flow MAF_THR and of the air mass flow MAF_CYL into the cylinders Z1 to Z4 and the sum of these mean square errors is found for each variation. This mean square error function is then minimized using an optimization procedure, whereby the first and second adjustment values D_ES, D_AS are determined. This is done with particular precision and ease using a gradient method, wherein the optimum is calculated numerically step by step. With the parameter vector $$b = \begin{pmatrix} D\_ES \\ D\_AS \end{pmatrix}$$

the following is obtained using an iterative method $$b_{n+1} = b_n + k \cdot \sum_i \left( \frac{\partial MAF\_CYL}{\partial b} \bigg|_{b_n} \cdot (MAF\_THR_i - MAF\_CYL_i(b_n)) \right)$$

where k is the increment which is a fixed preset value in a simple embodiment, but is preferably chosen to be a variable value, and i is the index whose value ranges from one up to the maximum value CTR_MAX. The iterative calculation is aborted if a predetermined number of calculation steps N has been exceeded or if the changes from one step to the next fall below a preset threshold.

As a result of applying this method there is determined in a calculation step N each contribution to the total i, in each case with an estimated value of the air mass flow MAF_THR in the respective position of the actuator and an estimated value, altered according to the adjustment value, of the air mass flow MAF_CYL in the respective position of the actuator.

A particularly good convergence is achieved if the so-called Levenberg method is used as the gradient method.

The adjustment values D_ES and D_AS can also be determined using another optimization procedure. Mathematical optimization procedures of this kind are known for controllers and regulators, for example, from the technical publication "Optimierung: Statische, dynamische, stochastische Verfahren für die Anwendung" ("Optimization: Static, dynamic and stochastic methods for application"), Markos Papageorgiou, Munich; Vienna: Oldenburg, 1991, ISBN 3-486-21799-2.

Figure 5:
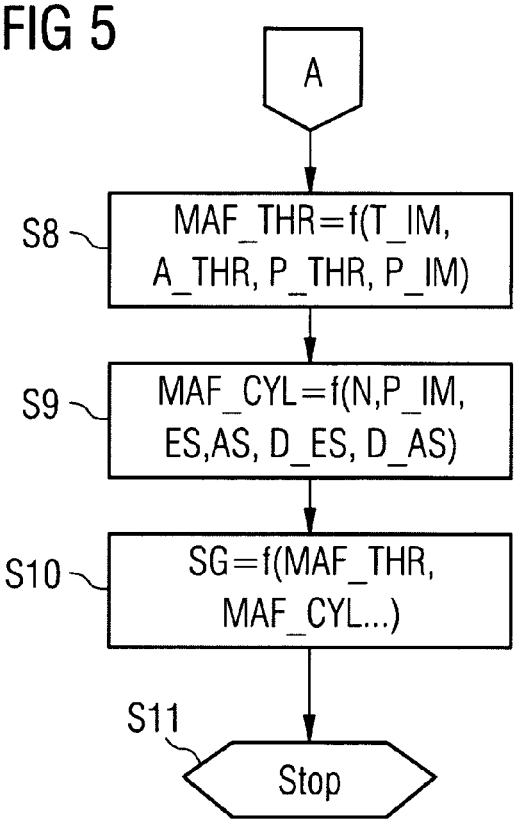

Processing is then resumed in the step following the connection point A. According to FIG. 5, this is step S8, in which the air mass flow MAF_THR in the air intake tract 1 in the area of the throttle valve 11 is then determined according to the relation given in step S4.

In a step S9, the air mass flow MAF_CYL into the cylinders Z1–Z4 of the internal combustion engine is determined using the observer relation as in step S5, whereby, in addition to the inlet-closes angle ES and outlet-closes angle AS, the first and second adjustment values D_ES and D_AS determined in step S7 are also taken into account. From these quantities it is then also possible to determine further estimated quantities as are described in WO 97/35106, thus, for example, the inlet pipe pressure, the exhaust gas backpressure, a exhaust gas temperature and, where there is external exhaust gas recirculation, a residual gas mass flow into the collector 12 of the air intake tract.

In a step S10, one or more correction variables are then determined, and specifically as a function of at least one estimated quantity, such as the air mass flow MAF_THR in the air intake tract 1 in the area of the throttle valve 11, the mass flow rate MAF_CYL into the cylinders Z1 to Z4 of the internal combustion engine and possibly also as a function of further measured variables. These correction variables are then converted into corresponding position signals for the actuators assigned to the actuators of the internal combustion engine. For example, in this manner there is determined an injection duration for the fuel injection valves 34, an advance angle, a desired degree of opening of the throttle valve or also a desired inlet-closes angle ES or outlet-closes angle AS for the gas exchange valves 30, 31.

As an alternative to step S3, a step S3a can also be provided, in which inlet-closes angle ES and the valve overlap VO are varied accordingly. The valve overlap VO is defined here by the crankshaft angle area, in which both the gas inlet valve 30 and the gas outlet valve 31 are opened.

In a further alternative, instead of step S3, there is provided a step S3b, in which outlet-closes angle AS and the valve overlap VO are varied accordingly. The subsequent steps are then adapted accordingly for both alternatives S3a and S3b. Thus, in particular in step S7 in the case of the alternative in step S3a a second adjustment value is determined for the valve overlap VO and in the event of the alternative of step S3b, a first adjustment value is determined for the valve overlap.

Figure 7:
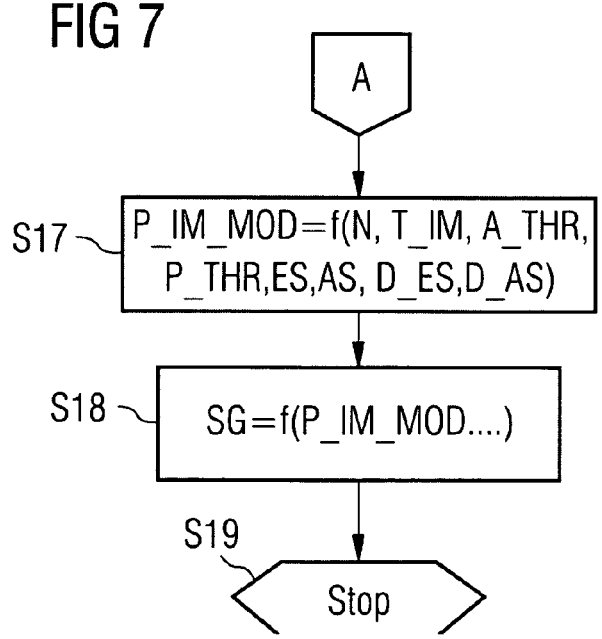
FIGS. 6, 7 show an alternative embodiment of a first and second part of a flow chart of a program for controlling the internal combustion engine.
Figure 6:
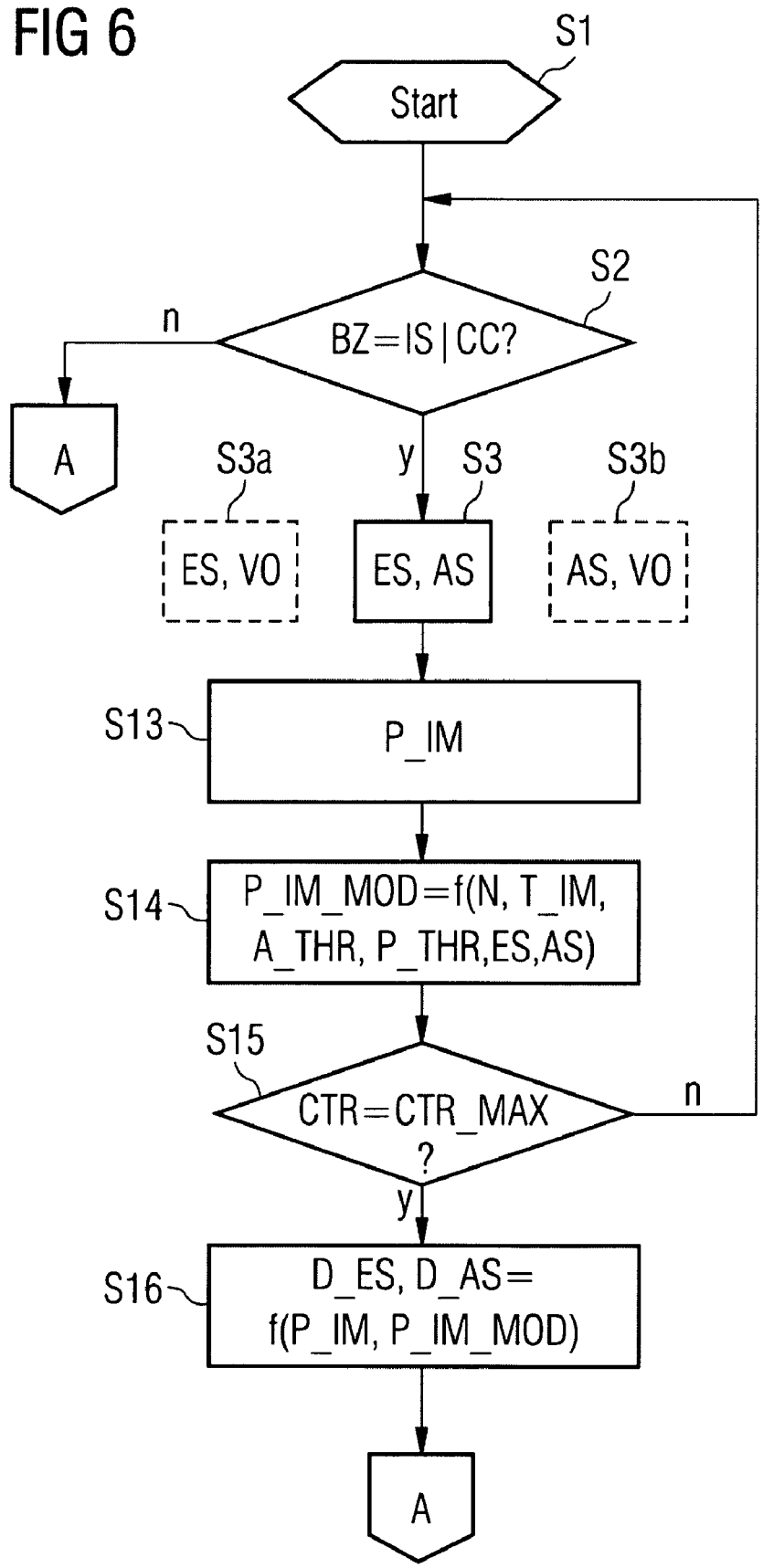

A further alternative embodiment of a program for controlling the internal combustion engine is described below with reference to FIGS. 6 and 7. In this case, however, only the differences from the embodiments described in FIGS. 4 and 5 are described again. Following on from step S3, the measured variable of the inlet pipe pressure P_IM is determined in a step S13. Subsequently, in a step S14, an estimated quantity P_IM_MOD of the inlet pipe pressure is determined using an observer. This is determined as a function of the speed N, the air intake temperature T_IM, the degree of opening A_THR of the throttle valve, the pressure P_THR upstream of the throttle valve 11 and the inlet-closes angle ES and outlet-closes angle AS of the gas inlet valve 30 or of the gas outlet valve 31. The measured variables are assigned to the relevant selected position of the first actuator or actuators and buffered in intermediate storage.

In a step S15 a check is made as in step S6 to determine whether the counter CTR has a maximum value CTR_MAX. If this is the case, the processing is continued in a step S16. There, using an optimization procedure, the calculation of the first adjustment values D_ES and second adjustment values D_AS is made as in step S7. The processing is subsequently continued in the step following the connection point A, thus, for example, in step S17 (see FIG. 7), in which step the estimated quantity P_IM_MOD of the inlet pipe pressure is determined as in step S14, whereby, in addition, the first or second adjustment value D_ES and D_AS are taken into account with respect to the inlet-closes angle ES and outlet-closes angle AS.

In step S18, as in step S10, there is determined a correction variable as a function of at least one estimated quantity, such as, for example, the estimated quantity P_IM_MOD of the inlet pipe pressure.

The programs described above are suitable in particular for valve adjusting drives which alter the phase position of the valve lift curves relative to the crankshaft angle of the gas inlet and gas outlet valves 30, 31. Correspondingly adapted programs are, however, also applicable for adjusting drives which, for example, alter the maximum valve lift and/or also alter the phase position. In this case the adjustment values are then, for example, indexed to the maximum valve lift or also to the valve lift duration relative to the crankshaft angle or camshaft angle. Furthermore, the programs are applicable, also correspondingly modified, for actuators which, for improved charging, are disposed upstream of the gas inlet valve 30 in the intake duct or in the inlet pipe 13. Such actuators are referred to, for example, as "impulse chargers".

As a result of the inclusion of the first and second adjustment values, the estimated quantities determined in steps S9 or S17 are then as a rule so precise that one can also dispense with the air mass sensor 14, which reduces the costs for the internal combustion engine and at the same time increases its level of efficiency, since the air mass sensor 14 regularly causes pressure losses in the air intake tract. Moreover, due to the precise calculation of the estimated quantities, a correspondingly precise metering of the required fuel mass can be achieved, whereby the emissions from the internal combustion engine can be kept at a very low level. By means of the above-mentioned methods it may be possible to calculate the estimated quantities so precisely that the exhaust gas probe 41 can also be dispensed with and yet the prescribed emission limit values can still be met by the internal combustion engine.

The invention claimed is:

1. A method for controlling an internal combustion engine having an air intake tract which comprises at least one inlet pipe leading to an intake duct per cylinder of the internal combustion engine, with at least one exhaust gas duct per cylinder of the internal combustion engine, with at least one first actuator which is disposed in an inlet pipe or in an intake duct or in an exhaust gas duct and influences exchange of gas in a respective cylinder, with further actuators which act upon the internal combustion engine, and with sensors which record the measured variables, comprising:

varying the position of at least the first actuator and, in preset selected positions, recording measured variables for determining a first and further estimated quantity, wherein at least the first estimated quantity is determined as a function of an estimated value, or a reading of a setting of the actuator, and of an adjustment value for the estimated value or reading of the setting;

performing an optimization procedure by which deviations of at least the first estimated quantity are minimized for preset selected positions by modification of the adjustment value for the estimated value or reading of the setting; and determining at least one correction variable for controlling at least the first actuator as a function of at least one estimated quantity which is determined as a function of the estimated value or a reading of the setting of the actuator and as a function of the adjustment value for the estimated value or reading of the setting.

2. The method according to claim 1, wherein a first estimated quantity of an air mass flow in the air intake tract is in an area of a throttle valve and the further estimated quantity is an air mass flow into the cylinders of the internal combustion engine.

3. A method for controlling an internal combustion engine with an air intake tract which comprises at least one inlet pipe leading to an intake duct per cylinder of the internal combustion engine, with at least one exhaust gas duct per cylinder of the internal combustion engine, with at least one first actuator which is disposed in an inlet pipe or in an intake duct or in an exhaust gas duct and influences gas exchange in a respective cylinder, with further actuators which act upon the internal combustion engine, and with sensors which record measured variables, comprising:

varying the position of the first actuator or actuators and, in preset selected positions, recording a first measured variable and at least one further measured variable for determining a further estimated quantity, wherein the further estimated quantity is determined as a function of an estimated value or a reading of a setting of the first actuator or actuators and of an adjustment value for the estimated value or reading of the setting;

performing an optimization procedure by which deviations of at least the first measured variable are minimized for preset selected positions by modification of the adjustment value for the estimated value or reading of the setting;

determining at least one correction variable for controlling the first actuator or actuators and/or further actuators as a function of at least one estimated quantity which is determined as a function of the estimated value or a reading of the setting of the first actuator or actuators and as a function of the adjustment value for the estimated value or reading of the setting.

4. The method according to claim 3, wherein the first measured variable and the further estimated quantity are pressure in the air intake tract in an area of a collector or of an inlet pipe.

5. The method according to claim 4, wherein a steady-state operating mode of the internal combustion engine the position of the first actuator or actuators is varied and the measured variables are determined in the preset positions.

6. The method according to claim 5, wherein the steady-state operating mode is an idle state or the fuel cut-off in an overrun state.

7. The method according to claim 3, wherein as a result of the optimization procedure, a sum of mean square errors of the deviations is minimized.

8. The method according to claim 3, wherein the optimization procedure is a gradient method.

9. The method according to claim 3, wherein the first actuator is a gas inlet valve and a gas outlet valve, the position of which is characterized by an inlet-closes angle and valve overlap angle relative to a crankshaft angle.

10. The method according to claim 3, wherein the first actuator is a gas inlet valve and a gas outlet valve, the position of which is characterized by an inlet-closes angle and an outlet-closes angle.

* * * * *